(12) United States Patent
Nygaard et al.

(10) Patent No.: US 8,905,374 B2
(45) Date of Patent: Dec. 9, 2014

(54) DOUBLE DISC GATE VALVE

(75) Inventors: Anders Nygaard, Kongsberg (NO); Roar Gravningen, Kongsberg (NO)

(73) Assignee: Kongsberg Esco AS, Kongsberg (NO)

( * ) Notice: Subject to any disclaimer, the term of this patent is extended or adjusted under 35 U.S.C. 154(b) by 108 days.

(21) Appl. No.: 13/131,760

(22) PCT Filed: Nov. 30, 2009

(86) PCT No.: PCT/EP2009/066040
§ 371 (c)(1),
(2), (4) Date: May 27, 2011

(87) PCT Pub. No.: WO2010/063671
PCT Pub. Date: Jun. 10, 2010

(65) Prior Publication Data
US 2011/0233442 A1 Sep. 29, 2011

(30) Foreign Application Priority Data
Dec. 1, 2008 (DK) ................... 2008 01689

(51) Int. Cl.
F16K 25/00 (2006.01)
F16K 3/00 (2006.01)
F16K 3/18 (2006.01)

(52) U.S. Cl.
CPC ...................... F16K 3/182 (2013.01)
USPC ............... 251/203; 251/327; 251/195

(58) Field of Classification Search
CPC ............... F16K 3/10; F16K 3/14; F16K 3/16; F16K 3/18; F16K 3/182; F16K 3/184; F16K 3/183
USPC ...................... 251/167, 168, 193–204, 77, 85
See application file for complete search history.

(56) References Cited

U.S. PATENT DOCUMENTS

| 1,707,125 | A | * | 3/1929 | Loffler | 251/193 |
| 2,073,727 | A | | 3/1937 | Bodnovich | |
| 2,502,689 | A | | 4/1950 | Yant | |
| 2,895,709 | A | | 7/1959 | Rattigan | |
| 3,208,717 | A | * | 9/1965 | Palmer et al. | 251/169 |
| 4,573,660 | A | | 3/1986 | Husted | |
| 6,254,060 | B1 | * | 7/2001 | Kennedy | 251/197 |

FOREIGN PATENT DOCUMENTS

| DE | 621349 | 11/1935 |
| DE | 2218407 | 10/1973 |
| FR | 2180655 | 11/1973 |
| JP | 63225768 A | 9/1988 |
| JP | 5099348 A | 4/1993 |

OTHER PUBLICATIONS

International Search Report for PCT/EP2009/066040 dated Mar. 30, 2010.

* cited by examiner

Primary Examiner — John K Fristoe, Jr.
Assistant Examiner — Hailey K Do
(74) Attorney, Agent, or Firm — McCormick, Paulding & Huber LLP

(57) ABSTRACT

The invention provides a double disc gate valve where the discs are movable in a casing by a disc manipulation structure which can change an orientation of at least one of the valve discs relative to the center plane away from an initial orientation by movement of an outer disc carrier relative to an inner disc carrier. The relative movement between the disc carriers is initiated automatically during opening and closing of the valve. The change in orientation facilitates sealing between the discs and valve seats by a gradually established contact between the discs and the seats and the required opening and closing force may therefore be reduced.

16 Claims, 3 Drawing Sheets

DOUBLE DISC GATE VALVE

CROSS REFERENCE TO RELATED APPLICATIONS

This application is entitled to the benefit of and incorporates by reference essential subject matter disclosed in International Patent Application No. PCT/EP2009/066040 filed on Nov. 30, 2009 and Danish Patent Application No. PA 2008 01689 filed Dec. 1, 2008.

FIELD OF THE INVENTION

The present invention relates to a valve comprising a casing with a fluid passageway, inlet and outlet seats, and a closure member movable relative to the passageway along a centre plane in an inwards direction for obtaining a closed configuration of the valve and in an opposite outwards direction for obtaining an open configuration of the valve. Such valves are sometimes referred to as "gate valves".

In such valves, the closure member may comprise two valve discs forming a so called double-disc gate valve.

BACKGROUND OF THE INVENTION

Gate valves are typically used for controlling a fluid flow in pipe systems, such as water supply or sewer systems. A double-disc gate valve typically comprises a casing forming a fluid passageway between two valve ports and two parallel valve discs movable in an inwards direction into the passageway and in an outwards direction out of the passageway.

A fluid conduit, e.g. a water pipe, is connected to each valve port. Typically, the valve ports are arranged so that the two pipes are axially aligned. Each valve port is surrounded by a valve seat inside the casing.

In a closed configuration of the valve, each valve disc along its periphery abuts a respective one of the valve seats, thereby fluidly separating the corresponding pipe from the inside of the valve casing and thus blocking the fluid flow. To enter an open configuration of the valve, the valve discs are moved outwardly. In practice, the discs are retracted substantially radially relative to the passageway and thereby perpendicularly to the flow direction. In this process, the discs move into a resting compartment of the casing which is arranged radially outside the passageway. To reenter the closed configuration of the valve, the valve discs are moved in the opposite direction, inwardly from the resting compartment into the passageway.

In fluid systems, the gate valves are typically oriented such that the valve discs move out of the passageway when they move vertically upwards during opening and so that they move into the passageway when moving downwards during closing of the valve. For making reading easier, outwards in the following means out of the passageway, i.e. typically vertically upwards, and inwards in the following means into the passageway, i.e. typically vertically downwards, unless specifically noted otherwise.

To ensure complete fluid separation of the inlet from the outlet of the valve, even at large fluid pressures, the valve typically comprises means for pressing the valve discs apart during the last part of the closing movement, thus forcing the periphery of the valve discs against the valve seats. Furthermore, the casing is typically provided with parallel, vertical tracks or notches, which engage a portion of the periphery of the valve discs or the laterally outer ends of a disc carrier, which holds the valve discs. In this way, the valve discs are guided during the vertical movement into or out of the passageway. The vertical movement of the valve discs is typically effected by a threaded stem or spindle, which may be connected to a handle or a hand wheel for manual operation or to an actuator for e.g. hydraulic or electrical operation.

One important advantage of double-disc gate valves is that they can easily be designed to provide—in the open configuration—a passage through the valve, which allows any object small enough to pass through the pipes to also pass through the valve without restriction. Thus, e.g. inspection, maintenance or cleaning of the piping system may be conducted with remotely operated vehicles (ROV).

Various devices have been invented for urging the valve discs apart during the last part of the closing movement. U.S. Pat. No. 2,502,689 discloses a double-disc gate valve as described above. A threaded stem with a hand wheel is used to move the valve discs vertically. The stem engages an inner thread at the top of the valve casing. Inside the valve casing, the stem is rotatably secured to a partly wedge-shaped disc carrier, which is connected through transversal bolts to lugs on the back side of each valve disc, i.e. the side facing towards the other valve disc. The bolt holes in the lugs are larger than the diameter of the bolts, which are thus allowed to move within the bolt holes. During closing of the valve, the valve discs hang by the lugs on the bolts until the valve discs abut the bottom of the valve casing or are otherwise prevented from moving further downwards. During a further downwards movement of the disc carrier, the wedge-shaped portion thereof slides along inclined surfaces on the back side of each valve disc, thereby urging them apart. During the first part of the opening movement, the bolts will slide along the inclined surfaces on the inside of the bolt holes, thereby pulling the valve discs towards each other to facilitate their subsequent outwards movement into the resting compartment.

FR 2.180.655, JP 63-225768 and JP 5-99348 respectively disclose double-disc gate valves, wherein the valve discs are connected to a disc carrier through a number of linkages, each of which is rotatably connected at one end to a lug on the back side of a valve disc and at the other end to the disc carrier. The linkages are arranged to keep the valve discs parallel at all times. During closing of the valve, the valve discs hang by the linkages on the disc carrier until the valve discs are prevented from moving further downwards, e.g. by the bottom of the casing. During a further downwards movement of the disc carrier, the linkages rotate and urge the valve discs apart. During a first part of the opening movement, the linkages correspondingly pull the valve discs towards each other, while the discs remain parallel.

All of the above described gate valves suffer from the disadvantage that a relatively large force is required to move the valve discs during the last part of the closing movement and during the first part of the opening movement where the discs are moved away from each other or towards each other. With manually operated gate valves this makes it difficult for the operator to close and open the valves. With automatically operated gate valves, the actuators must be dimensioned for this part of the movement, although the remaining part of the movement requires substantially less force. Hence, weight, size and cost of the actuators are relatively high.

SUMMARY OF THE INVENTION

It is an object of the present invention to overcome the above mentioned disadvantages by providing a valve which is easier to open and to close. It is a further object to provide a valve with a simple and reliable structure and to provide a valve which is easy to keep in a good mechanical condition, to clean, to inspect, and to repair.

The valve according to the invention comprises a disc manipulation structure with an inner and an outer disc carrier, the disc manipulation structure being adapted to change an orientation of at least one of the valve discs away from an initial orientation by movement of the outer disc carrier relative to the inner disc carrier, wherein the relative movement between the disc carriers is initiated as an integrated part of an opening and closing procedure during movement of the closure member in the outwards and inwards directions.

Due to the transformation of the movement of the discs in the inward direction to a reorientation of at least one of the discs relative to the centre plane, the final sealing of the discs against the inlet and outlet seats may be carried out efficiently during a change in orientation of at least one of the discs relative to the centre plane. The change in orientation facilitates sealing between the discs and valve seats by a gradually established contact between the discs and the seats, and the required opening and closing force may therefore be reduced. At the same time, the softer opening and closing may reduce wear and noise during opening and closing and it may protect other elements of the piping system.

In one embodiment, the valve incorporates a hindrance arranged to initiate the relative movement between the disc carriers during movement of the closure member in the inwards direction by hindering movement of one of the disc carriers while the other one of the disc carriers are allowed to continue movement in the inwards direction.

In practice, the claimed relative movement between the disc carriers during movement of the closure member in the inwards direction may be obtained by moving means which moves the valve between the open and closed configurations by movement of the outer disc carrier inwards or outwards.

In practice, the valve discs may be connected both to the outer disc carrier, and to the inner disc carrier in such a way that movement of the outer disc carrier in the inward direction causes simultaneous movement of the valve discs and the inner disc carrier in the inwards direction.

The valve discs and the inner disc carrier may follow this movement until the inner disc carrier reaches a hindrance, e.g. the wall of the passageway. When the outer disc carrier moves further inwards, the movement of the outer disc carrier relative to the inner disc carrier may cause the mentioned change in the orientation of at least one of the discs relative to the centre plane away from an initial orientation of that disc relative to the centre plane.

When the valve disc or valve discs are prevented from further change of its orientation away from the initial orientation, the disc manipulation structure may be adapted to change the orientation of the valve disc relative to the centre plane back towards the initial orientation of the valve disc by further movement of the outer disc carrier relative to the inner disc carrier.

This change in reorientation direction, i.e. the change from moving away from the initial orientation to moving back towards the initial orientation may occur e.g. as a consequence of an inwards portion of the periphery of the valve disc coming in contact with a corresponding portion of the inlet or outlet seat.

In particular, the disc manipulation structure may be adapted to change the orientation of both valve discs relative to the centre plane and relative to each other away from the initial orientation of the valve discs and back towards the initial orientation of the valve discs by movement of the outer disc carrier relative to the inner disc carrier. In the following description, this embodiment of the disc manipulation structure will be referred to as a double disc manipulation structure.

The double disc manipulation structure may in particular move the discs away from and towards a configuration where the valve discs are parallel. The valve discs may, however, not necessarily ever reach such a parallel configuration.

The disc manipulation structure may e.g. be located between the valve discs, and it may be provided so that it becomes movable completely out of the passageway and into the resting compartment during opening of the valve.

In particular, the disc manipulation structure may comprise an outer and an inner disc carrier which are connected to both valve discs by a linkage structure. The linkage structure may comprise an outer link and an inner link, the outer link comprising a first and a second outer element, the first outer element being rotationally fixed to the outer disc carrier and to one of the valve discs, and the second outer element being rotationally fixed to the outer disc carrier and to the other valve disc, and the inner link comprises a first and a second inner element, the first inner element being rotationally fixed to one of the valve discs and to the inner disc carrier and the second inner element being rotationally fixed to the other valve disc and to the inner disc carrier.

The first and second outer elements may extend from an outwards portion of a corresponding valve disc and in a direction both outwards and towards the centre plane where they are rotationally fixed to the outer disc carrier.

The first and second inner elements may extend from an inwards portion of a corresponding valve disc and in a direction both inwards and towards the centre plane where they are rotationally fixed to the inner disc carrier.

The closure member is movable in the outwards or inwards directions by a moving means, e.g. comprising a valve operation handle, or comprising an electrical or hydraulic actuator.

It may be an advantage to connect the moving means directly to the outer disc carrier so that the outer disc carrier, by its connection to the discs, moves the discs and the inner disc carrier in the inwards and outwards directions when the valve is operated.

The hindrance may be constituted by a wall of the passageway. In one embodiment, the outer disc carrier, by its connection to the discs, moves the discs and the inner disc carrier in the inwards direction for closing the valve. When the inner disc carrier reach the wall of the passageway, the wall constitutes the hindrance and further movement of the inner disc carrier is prevented. At this point, at least one of the discs starts to reorient during further movement of the outer disc carrier in the inwards direction.

In the opening procedure, the moving means pulls the outer disc carrier in the outwards direction, and first after the outer disc carrier has moved a certain distance, the linkage structure pulls the inner disc carrier along in the outwards direction. While the outer disc carrier moves without movement of the inner disc carrier, the at least one disc moves towards the initial orientation, possibly after firstly having moved away from the initial orientation, so that it reaches an orientation relative to the centre plane in which it is ready to be moved in the outwards direction out of the passageway and into the resting compartment.

To support movement of the discs and the disc carriers, the casing may form a track for guiding the disc carriers in the inwards and outwards directions during closing and opening of the valve. In one embodiment, the hindrance is formed along this track, or it forms an integrated part of the track.

The valve may be oriented relative to gravity so that impact of the gravitational force moves the discs and the disc carriers in the inwards direction against the forces from the moving means by which the valve is operated. To enable a more freely selection of valve orientation, the valve may comprise a spring-force structure urging the valve discs and/or at least one of the disc carriers in the inwards direction to substitute or to accomplish the gravitational force.

Due to the reorientation of the valve discs relative to the centre plane or relative to each other, a new way of establishing gradual sealing between the seats and the discs becomes possible. As an example, the inlet and outlet seats may each have an inner sealing surface portion along that portion of the passageway which is opposite the location of the resting compartment and an outer sealing surface portion along that portion of the passageway where the resting compartment opens into the passageway. The inner and outer portions of the sealing surface portions may be non parallel or offset relative to each other in the direction of the passageway. In this way, the inner sealing surface portions may become perpendicular to the centre plane, and the outer sealing surface portions may form an angle to the centre plane which angle is less than 90 degrees.

In a second aspect, the invention provides a fluid system incorporating a valve according to the above description. The valve may in particular be arranged relative to gravity so that gravity influences the closure member in the inwards direction.

In a third aspect, the invention provides a method of facilitating easier opening and closing of a gate valve, the method comprising:

providing a casing with a fluid passageway, inlet and outlet seats, and a closure member movable relative to the passageway along a centre plane in an inwards direction for obtaining a closed configuration of the valve, and in an opposite outwards direction for obtaining an open configuration of the valve, providing the closure member with two valve discs and a disc manipulation structure, arranging the valve discs substantially symmetrically about the centre plane providing each valve disc with a peripheral edge portion matching a corresponding one of the inlet and outlet seats to enable contact between the peripheral edge portion and the seat in the closed configuration of the valve, providing the manipulation structure with an outer and an inner disc carrier, both disc carriers being connected to both valve discs by a linkage structure, so that the disc manipulation structure becomes adapted to change an orientation of at least one of the valve discs relative to the centre plane away from an initial orientation by movement of the outer disc carrier relative to the inner disc carrier, and providing a hindrance arranged to initiate such relative movement between the disc carriers during movement of the closure member in the inwards direction.

BRIEF DESCRIPTION OF THE DRAWINGS

In the following, the invention will be described in further details with reference to the drawings in which.

DETAILED DESCRIPTION OF AN EMBODIMENT OF THE INVENTION

Figure 1:
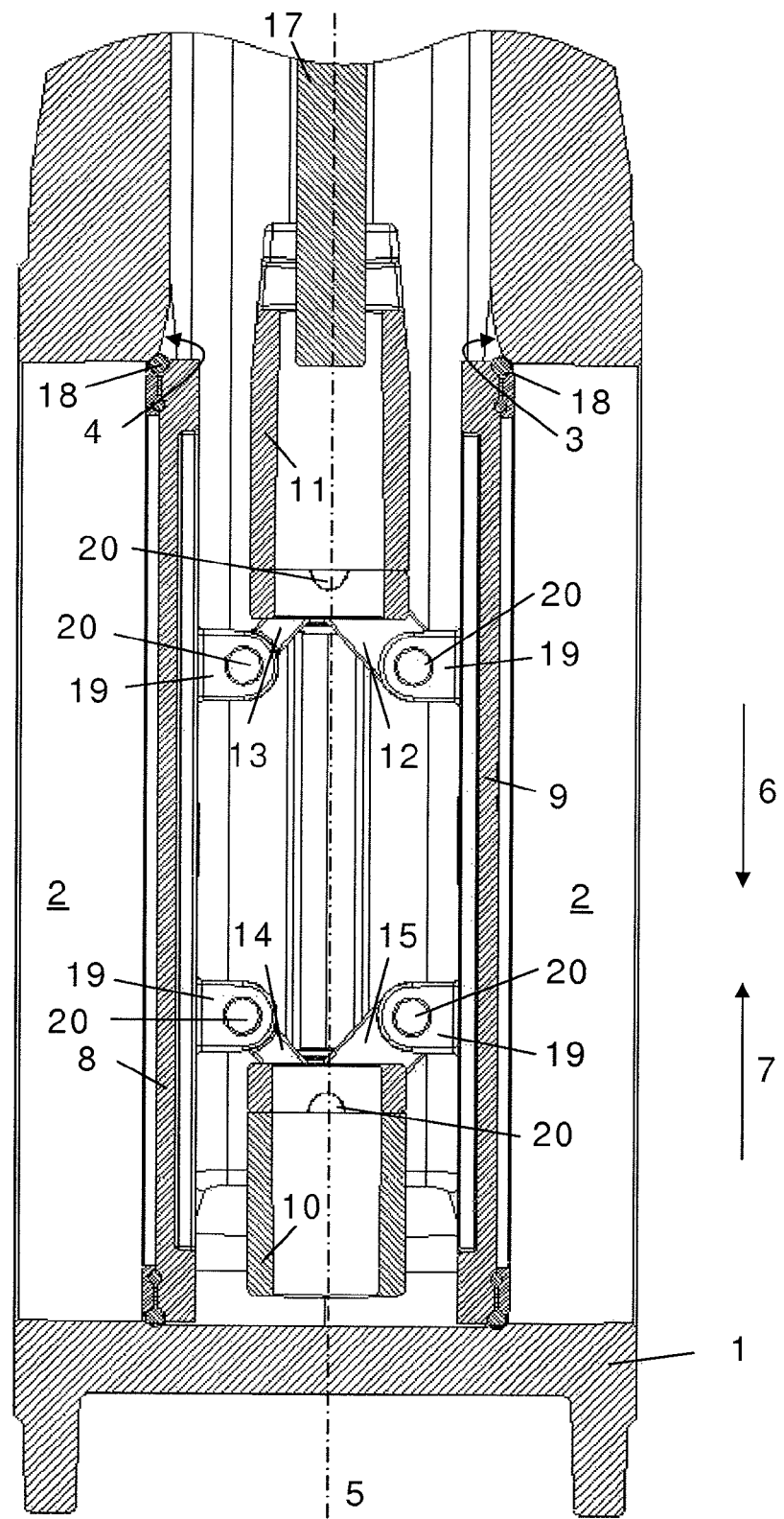
FIG. 1 illustrates a gate valve in a closed configuration in a cross sectional view.
Figure 2:
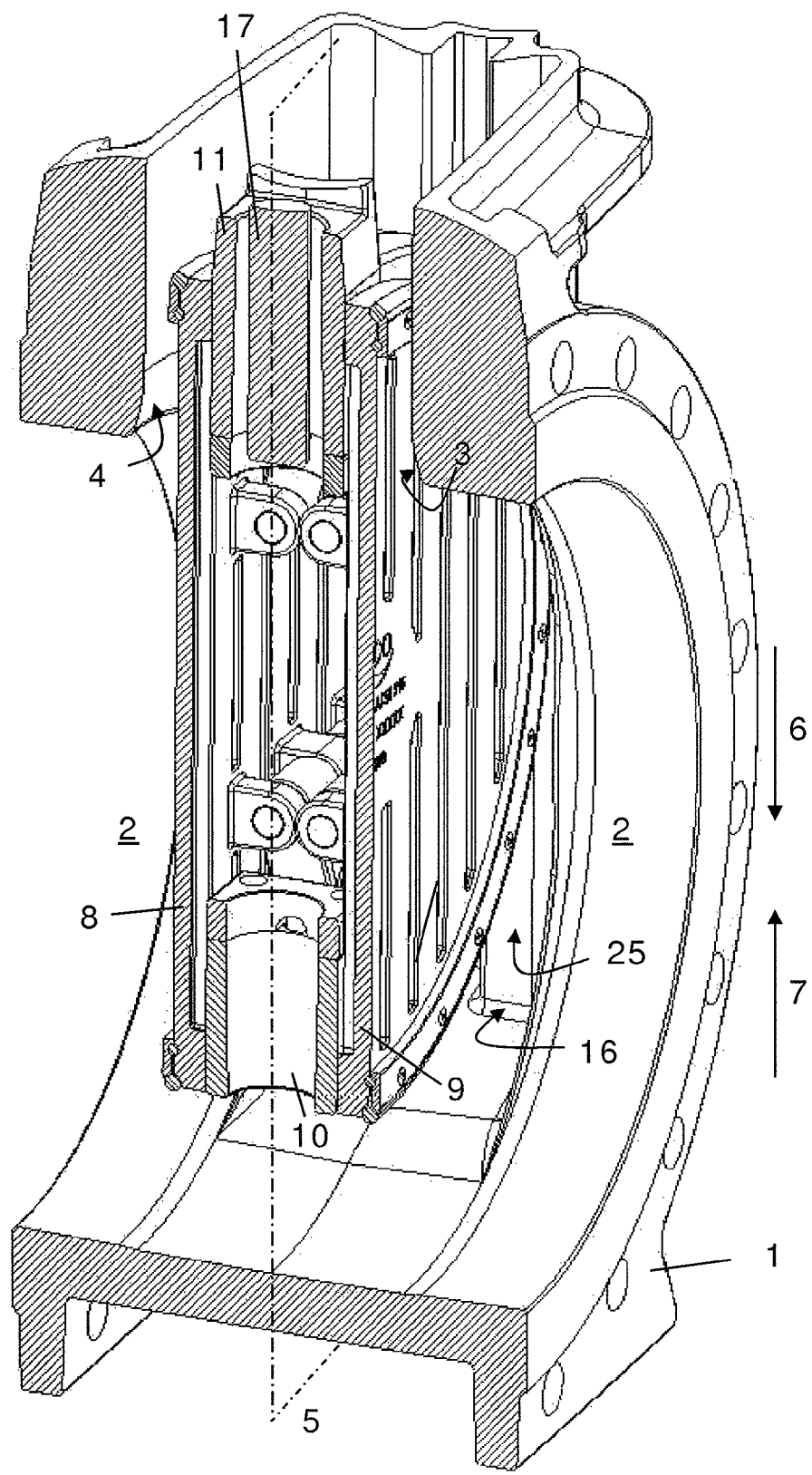
FIG. 2 illustrates a perspective view of a cross section of a gate valve in a partly open configuration.
Figure 3:
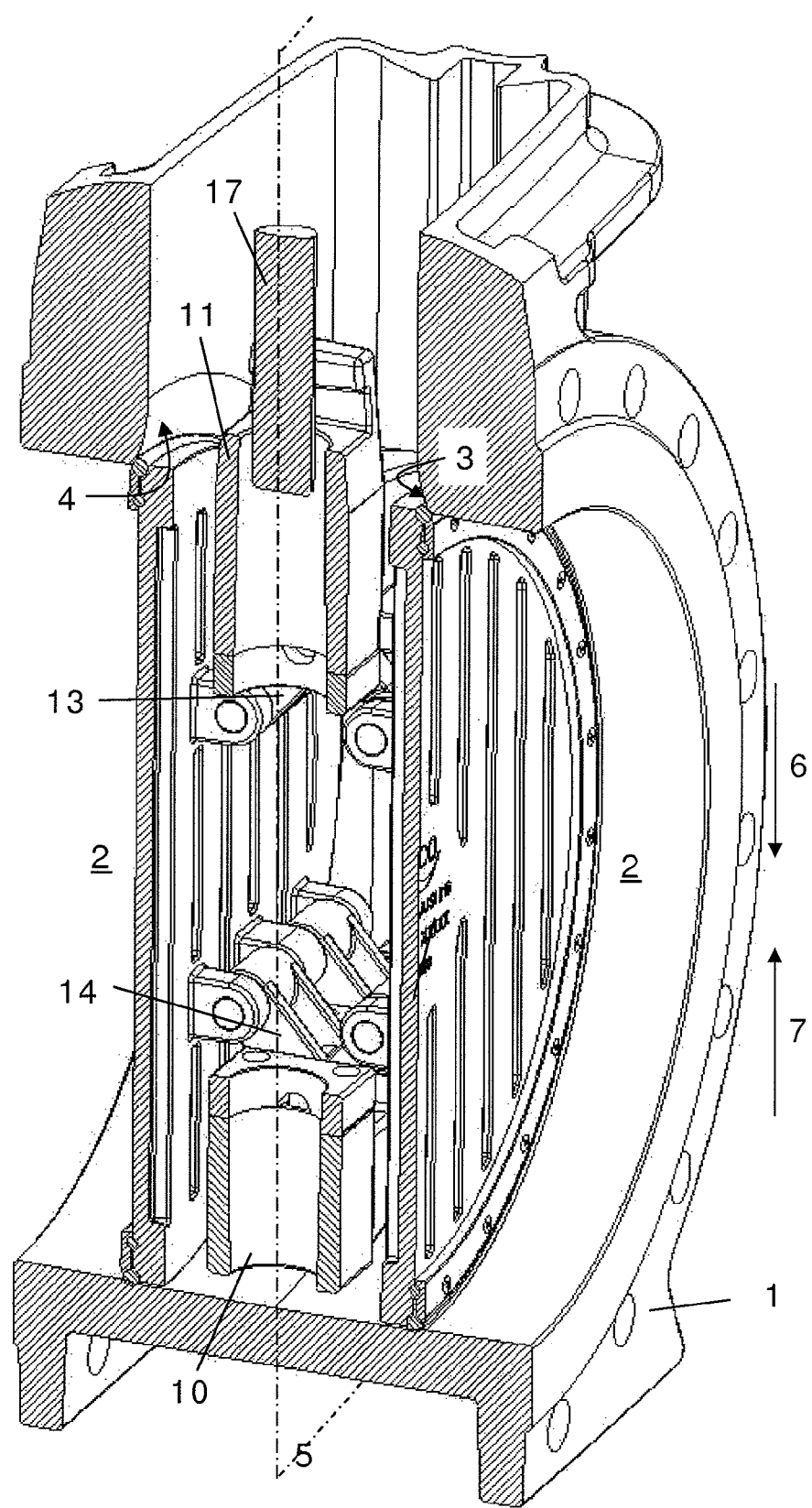
FIG. 3 illustrates a cross sectional view of the gate valve in a closed configuration.

The gate valve according to the invention is illustrated in FIGS. 1-3. The valve comprises a casing 1 with a fluid passageway 2, an inlet seat 3 and an outlet seat 4. The valve further comprises a closure member which is movable relative to the passageway 2 along a centre plane illustrated by the dotted line 5. By movement of the closure member in an inwards direction, illustrated by the arrow 6, the valve is moved towards a closed configuration, and by movement in the opposite, outwards direction, illustrated by the arrow 7, the valve is moved towards an open configuration.

The closure member comprises two valve discs 8, 9 and a disc manipulation structure which comprises an inner disc carrier 10 and an outer disc carrier 11. The disc carriers are fixed to the discs 8, 9 via rotatable linkages 12, 13, 14, 15 (best seen in FIG. 1), such that at least one outer linkage element 12 and preferably two outer linkage elements 12, 13 extend(s) from an outwards portion of each valve disc outwards and in a direction towards the centre plane 5 to the outer disc carrier 11 where it is fixed rotationally. At least one inner linkage element 14, and preferably two inner linkage elements 14, 15 extend(s) from an inwards portion of each valve disc inwards and in a direction towards the centre plane to the inner disc carrier 10. In the following, the linkage elements 12, 13, 14, 15 are referred to as "linkages".

The valve casing 1 forms a track 25, c.f. FIG. 2, for guiding the disc carriers 10, 11 in the closing and opening directions during closing and opening of the gate valve respectively.

The track 25 has an end stop 16 forming a hindrance which in the closed configuration of the gate valve prevents the inner disc carrier 10 from moving further in the inwards direction. The stop 16 may comprise a structure which abuts the inner disc carrier 10 and/or at least one of the valve discs 8, 9 at a predetermined position thereof.

The valve comprises moving means 17 for moving the valve between the open and the closed configuration. The moving means 17 may comprise a manually operated handle or a servo operated mechanism e.g. operating on a spindle. The moving means 17 is arranged to move the closure member via contact with the outer disc carrier 11.

A first bias force urges the inner disc carrier 10 inwards and a second bias force urges the valve discs 8, 9 inwards. If the gate valve is oriented so that inwards is also downwards with regards to gravitational forces acting on the valve, the first and second bias forces may be caused by gravitation acting on the inner disc carrier 10 and/or the valve discs 8, 9.

Alternatively or additionally, the first and second bias forces may be caused directly or indirectly by spring means (not shown) arranged e.g. between the inner and the outer disc carrier 10, 11, between the inner disc carrier 10 and the casing 1, between the valve discs 8, 9 and the outer disc carrier 11, between the valve discs 8, 9 and the inner disc carrier 10 and/or between both valve discs 8, 9.

The gate valve further comprises stopping means 16 for preventing the valve discs 8, 9 from moving further inwards than required to tightly abut the valve seats. The stopping means 16 may act on the valve discs 8, 9 directly or indirectly via e.g. the inner linkages 14, 15.

The valve discs may comprise sealing means facilitated by rubber profile or gaskets 18 or similar resilient structures. When the valve is in the closed configuration, the sealing means abut sealing surfaces of the valve seats 3, 4.

Each sealing surface comprises an inner sealing surface portion located on the inwards side of the corresponding valve port and an outer sealing surface portion located on the outwards side, the inner and outer sealing surface portions being separated circumferentially and each taking up approximately half of the sealing surface.

The inner sealing surface portions are oriented substantially perpendicular to the centre plane, whereas the outer sealing surface portions are oriented at a substantially smaller angle, such as about 30° or in the range between 45° and 15°, with respect thereto. The outer sealing surface portions may also, as indicated in FIG. 1, be rounded so as to present an angle which varies over the surface.

During closing of the gate valve, the moving means 17 move the outer disc carrier 11 inwards. Due to the bias forces, the valve discs 8, 9, and the inner disc carrier 10 follow this movement until the inner disc carrier 10 reaches the end stop 16.

When the outer disc carrier moves further inwards, the inner linkages 14, 15 are caused to rotate thereby urging the inwards portions of the valve discs 8, 9 apart.

The linkages and the bias forces are dimensioned such that the outer linkages 12, 13 do not rotate yet, so that the valve discs continue to move inwards. The inner linkages 14, 15 continue to rotate until the stopping means 16 prevents the valve discs 8, 9 from moving further inwards.

In this position, the inwards portion of the periphery of each valve disc, i.e. in FIG. 1 the lower part of the periphery, abuts or nearly abuts a corresponding part of the sealing surface portions, in the following referred to as "inner sealing surface". When the outer disc carrier 11 moves further inwards, the outer linkages 12, 13 are caused to rotate thereby urging the outwards portions of the valve discs apart until the outwards portion of the periphery of each valve disc 8, 9 abuts the corresponding outer sealing surface portions (at the location indicated by the numeral 3 and 4 in FIG. 1).

During this movement, the most inwards portions of the valve discs 8, 9 move towards each other, possibly sliding along the inner sealing surface portions.

The location of the pivot axis of each valve disc 8, 9 relative to the valve discs 8, 9 causes one portion of each valve disc 8, 9 to move in one direction relative to the passageway 2 and another portion of the valve discs 8,9 to move in the opposite direction relative to the passageway 2.

Further inwards movement of the outer disc carrier 11 causes the outwards portions of the valve discs 8, 9 to separate further, whereby the outwards portions of the peripheries slide along the outer sealing surface portions and, due to the orientation of the outer sealing surface portions, press the inwards portions of the periphery of the valve discs towards the inner sealing surface portions.

Thus, both the inwards and the outwards portions (in FIG. 1 the lower and upper portions) of the periphery are pressed against the seats which ensures a pressure-tight closing of the gate valve.

By selection of different angles of the linkages 12-15, the linkages may transform a relative large movement of the outer disc carrier 11 into a relatively small movement of the valve discs 8, 9, so that the gate valve can be closed by applying a relatively small force to the moving means 17.

The sealing surfaces and/or the valve discs 8, 9 may comprise gaskets, e.g. O-ring seals, for improving the tightness of the gate valve.

The linkages 12-15 may be connected to lugs 19 on the backsides of the valve discs 8, 9, and the rotational hinges 20 allow rotation of the linkages 12-15 relative to the disc carriers 10, 11 and relative to the discs 8, 9.

The moving means 17 may comprise a threaded stem being rotatably secured to the top of the casing 1 and engaging an inner thread in the outer disc carrier 11.

The inner sealing surfaces and the inside surface portion of the casing 1 between the valve ports may be flush with the openings, which constitute the valve ports, so that the inwards wall of the gate valve presents a flush surface for the fluid, thus reducing turbulences in the fluid flow. Furthermore, if the gate valve is oriented with the inwards direction downwards, unwanted particles, such as pebbles or sand, will not gather at the bottom of the gate valve, but will be flushed with the fluid.

The valve discs 8, 9 and the valve ports are preferably circular, but may be of any practical shape, e.g. rectangular with rounded edges.

The number of parallel linkages at each position may be e.g. two, four or six. A larger number enables a more even distribution of forces to the valve discs 8, 9.

The gaskets 18 may be held in place by annular gasket retainers secured to the valve discs 8, 9. Additional gaskets may be arranged to seal between the gasket retainers and the valve discs 8, 9.

The gate valve and parts hereof may be manufactured from brass, cast iron, stainless steel, aluminium, plastic and/or other suitable materials. The gaskets may be manufactured from e.g. rubber. The gate valve may comprise flanges for connecting pipes to the valve ports.

While the present invention has been illustrated and described with respect to a particular embodiment thereof, it should be appreciated by those of ordinary skill in the art that various modifications to this invention may be made without departing from the spirit and scope of the present.

What is claimed is:

1. A double disc gate valve comprising a casing forming a fluid passageway, inlet and outlet seats, and a closure member movable relative to the passageway along a centre plane in an inwards direction for obtaining a closed configuration of the valve and in an opposite outwards direction for obtaining an open configuration of the double disc gate valve the closure member comprising two valve discs and a disc manipulation structure with an inner and an outer disc carrier, both disc carriers being connected to both valve discs, the disc manipulation structure being adapted to change orientation of at least one of the two valve discs away from an initial orientation by movement of the outer disc carrier relative to the inner disc carrier, wherein the relative movement between the disc carriers is initiated as an integrated part of a closing and opening procedure during movement of the closure member in the inwards and outwards directions, wherein the change in orientation of at least one of the valve discs includes a movement away from a configuration where the valve discs are parallel to a configuration in which the valve discs are not parallel or a movement from a configuration in which the valve discs are not parallel to a configuration in which the valve discs are parallel, and wherein both disc carriers are connected to both valve discs by a linkage structure comprising an outer link and an inner link that allow one of the inner disc carrier and outer disc carrier to move, at least partially, while an other of the inner disc carrier and outer disc carrier remains stationary, the outer link comprising a first and a second outer element, the first outer element being rotationally fixed to the outer disc carrier and to one of the valve discs, and the second outer element being rotationally fixed to the outer disc carrier and to the other valve disc, and the inner link comprises a first and a second inner element, the first inner element being rotationally fixed to one of the valve discs and to the inner disc carrier and the second inner element being rotationally fixed to the other valve disc and to the inner disc carrier.

2. The valve according to claim 1, wherein the valve discs are arranged substantially symmetrically about the centre plane throughout the opening and closing procedure.

3. The valve according to claim 1, wherein each valve disc has a peripheral edge portion matching a corresponding one of the inlet and outlet seats to enable contact between the peripheral edge portion and the valve seat in the closed configuration of the valve.

4. The valve according to claim 1, wherein the valve discs are prevented to change orientation further away from the initial orientation when reaching a pre-specified orientation.

5. The valve according to claim 4, wherein the disc manipulation structure is adapted to change the orientation of the valve disc back towards the initial orientation of the valve disc by further movement of the outer disc carrier relative to the inner disc carrier after the valve disc has reached the pre-specified orientation.

6. The valve according to claim 1, wherein the disc manipulation structure is adapted to change the orientation of both valve discs away from an initial orientation of both valve discs and back towards the initial orientation of the valve discs by movement of the outer disc carrier relative to the inner disc carrier.

7. The valve according to claim 1, wherein the disc manipulation structure is located between the valve discs.

8. The valve according to claim 1, wherein the first and second outer elements extend from an outwards portion of a corresponding valve disc and in a direction both outwards and towards the centre plane where they are rotationally fixed to the outer disc carrier.

9. The valve according to claim 1, wherein the first and second inner elements extend from an inwards portion of a corresponding valve disc and in a direction both inwards and towards the centre plane where they are rotationally fixed to the inner disc carrier.

10. The valve according to claim 1, wherein the closure member is movable in the outwards or inwards directions by moving means which is fixed to the outer disc carrier.

11. The valve according to claim 1, wherein the valve comprises a hindrance arranged to initiate the relative movement between the disc carriers by hindering movement of one of the disc carriers during movement of the closure member in the inwards direction.

12. The valve according to claim 11, wherein the hindrance is constituted by a wall of the passageway.

13. The valve according to claim 1, wherein the casing forms a track for guiding the disc carriers in the inwards and outwards directions during closing and opening of the valve.

14. The valve according to claim 1, wherein the inlet and outlet seats each comprises an inner sealing surface portion and an outer sealing surface portion, the sealing surface portions facing towards the valve discs in the closed configuration, the inner sealing surface portions being substantially perpendicular to the centre plane, and the outer sealing surface portions forming an angle less than 90 degrees to the centre plane.

15. A fluid system incorporating a valve according to claim 1, the valve being located so that gravity presses the closing member in the inwards direction.

16. A method of facilitating easier opening and closing of a gate valve, the method comprising:
   providing a casing with a fluid passageway, inlet and outlet seats, and a closure member movable relative to the passageway along a centre plane in an inwards direction for obtaining a closed configuration of the valve, and in an opposite outwards direction for obtaining an open configuration of the valve,
   providing the closure member with two valve discs and a disc manipulation structure,
   arranging the valve discs substantially symmetrically about the centre plane,
   providing each valve disc with a peripheral edge portion matching a corresponding one of the inlet or outlet seats to enable contact between the peripheral edge portion and the seat in the closed configuration of the valve,
   providing the manipulation structure with an outer and an inner disc carrier, both disc carriers being connected to both valve discs by a linkage structure, wherein the linkage structure comprising an outer link and an inner link that allow one of the inner disc carrier and outer disc carrier to move, at least partially, while the other of the inner disc carrier and outer disc carrier remains stationary, the outer link comprising a first and a second outer element, the first outer element being rotationally fixed to the outer disc carrier and to one of the valve discs, and the second outer element being rotationally fixed to the outer disc carrier and to the other valve disc, and the inner link comprises a first and a second inner element, the first inner element being rotationally fixed to one of the valve discs and to the inner disc carrier and the second inner element being rotationally fixed to the other valve disc and to the inner disc carrier, so that the disc manipulation structure becomes adapted to change an orientation of at least one of the valve discs relative to the centre plane away from an initial orientation by movement of the outer disc carrier relative to the inner disc carrier, the change in orientation of at least one of the valve discs including a movement away from a configuration where the valve discs are parallel to a configuration in which the valve discs are not parallel or a movement from a configuration in which the valve discs are not parallel to a configuration in which the valve discs are parallel, and
   providing a hindrance arranged to initiate such relative movement between the disc carriers during movement of the closure member in the inwards direction by stopping movement of one of the disc carriers for a portion of the movement of the closure member.

* * * * *